Nov. 24, 1970  A. A. BURRELL  3,541,871

UNIVERSAL-TYPE HUB

Filed March 14, 1969

Inventor
ALFRED A. BURRELL
W. Irwin Haskett
Attorney

United States Patent Office 3,541,871
Patented Nov. 24, 1970

3,541,871
UNIVERSAL-TYPE HUB
Alfred A. Burrell, 10323 106th St.,
Edmonton, Alberta, Canada
Filed Mar. 14, 1969, Ser. No. 807,343
Int. Cl. F16h 55/12, 55/30
U.S. Cl. 74—447        7 Claims

ABSTRACT OF THE DISCLOSURE

A universal type hub for releasably carrying shaft-mounted products of various materials, the hub consisting of two separate parts, namely a sleeve having longitudinally extending tooth-like splines, divided by circumferentially spaced block teeth on its exterior and a longitudinal keyway on its interior in radial alignment with one of said block teeth, the splined exterior being also threaded if desired, and a collar with an axial sleeve-accommodating opening correspondingly formed to register with said splines and block teeth for mounting on the sleeve. Various shaft-carried products including gears, sprockets, sheaves and the like for interchangeable mounting on said hubs have axial openings correspondingly formed to register with said splines and block teeth of the hub sleeve for longitudinal press-on engagement to provide an efficient torque distributing relationship therewith while designed to coact also in selected ways with said hub collar.

---

This invention relates to improvements in a hub and appertains particularly to an interchangeable and/or universal type hub-like device suitable for use with a wide variety of shaft-mounted products of any desired material such as plastic, non-ferrous metal and/or steel. Heretofore as the product was normally bolted or welded to the hub, the material of the product was limited to ferrous metals and practically restricted to steel.

It is an object of this invention to provide an interchangeable, universal type hub for any of a wide variety of shaft-mounted products that is an improvement on my earlier inventions, comprising now two separate parts namely, a sleeve and a collar in longitudinal press-on and non-rotatable relationship.

A further object of this invention is to provide an improved interchangeable, universal type hub for shaft-mounted products including gears, sprockets, sheaves and the like wherein the hub sleeve that is normally keyed on the shaft is formed to coact in a novel and efficient torque distributed relation with the product carried thereby.

A further object of the invention is to provide an improved construction of hub and interchangeable product enabling the reduction of the thickness of the hub by relating a specific exterior splining of the hub to the interior keyway, thereby allowing a wider varation in the bore size of the hubs with a given exterior diameter.

A further object of the invention is to provide a hub and product connection embodying longitudinally extending splines and circumferentially spaced block teeth that assures fixed location where indexing application is required and allows of reversing and synchronizing the product.

A still further object of the invention is the provision of a universal type hub for interchangeable use with various products consisting of a shaft engaging sleeve and a sleeve carried collar, wherein the sleeve is of steel for key-connection with the shaft but the collar may be of ferrous metal, non-ferrous metal, plastic or other suitable substance or composition.

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure wherein like characters indicate like parts throughout the several views.

Figure 1:
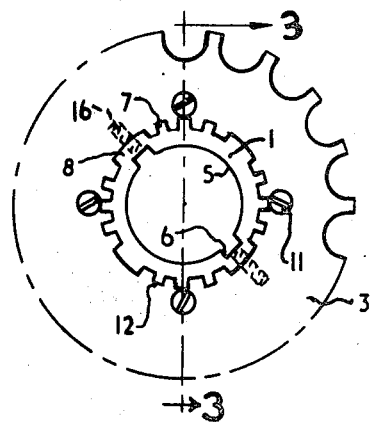
FIG. 1 is a front elevation of an embodiment of my hub and product.
Figure 3:
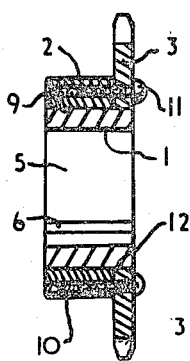
FIG. 3 is a vertical section, as taken on line 3—3 of FIG. 1.
Figure 2:
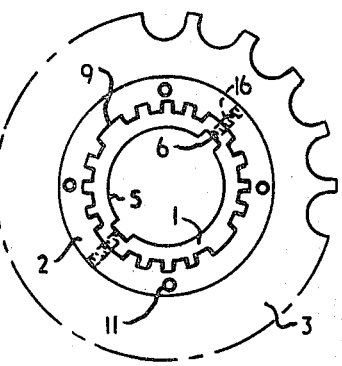
FIG. 2 is a rear elevation thereof.
Figure 4:
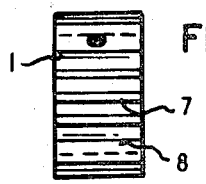
FIGS. 4, 5 and 6 are side elevations of the components of this embodiment, namely, the hub sleeve, hub collar and sprocket, respectively.
Figure 5:
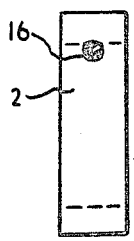
Figure 6:

In carrying out this invention, it will be seen, on referring to these drawings, that the assembled shaft-mounted device preferably comprises two principal elements, namely, a two-part hub consisting of an interiorly bored sleeve 1 and a collar 2, non-rotatably mounted on the sleeve 1, and any wheel-like product 3 such as a gear, sprocket, sheave, or the like for disconnectible mounting on the hub in a distinctive, efficient, torque distributing relationship. In such an assembly, certain structural characteristics and relationships are critical, for example the assured non-rotatable connection of the hub sleeve—on its shaft as by one or more keys, hence the need to use a strong metal such as steel for this part; the secure mounting of the hub collar 2 on the sleeve; the provision of a practical connection between the hub and wheel-like product 3 that will so distribute the torque or spread the load that will allow of the interchangable product 3 being fabricated of such suitable materials as non-ferrous metals, plastic, other synthetics and the like; a specific orientation of the load bearing structural features on the exterior of the sleeve to the keyway on the interior thereof for coacting with a shaft key as will permit the construction of hubs of minimum exterior diameter and thus enable the use of a variety of interchangeable products of small physical size; and the juxta-positioning of the product 3 to the hub collar part 2 to assure and reinforce the true positioning thereof together with the further selective attachment of the product to the hub where desired.

For the device shown in FIGS. 1–6 inclusive, the hub sleeve 1 has an interior or axial bore 5 with a pair of diametrically opposite keyways 6. The exterior of the hub has longitudinally extending tooth-like splines 7 interspersed with circumferentially spaced block teeth 8, the latter being four in number and arranged in substantially diagonally opposite pairs. It will be noted that two of the block teeth are in radial registry with the keyways 6, being so located and of such width as to enable the keyways to be partially buried therein. Furthermore, when four block teeth are used as in this case, the splines on the hub are of such number that when divided by four will give an odd number quotient e.g. 20/4=5, 28/4=7. Besides extending the bore range of any given diameter of hub by allowing the shaft key to be partially buried in the block tooth in space that would otherwise be taken up by the splines, this spline and block tooth design provides for positive indexing of the product when applied either head-on or reversed, such registry being also important when connecting the wheel-like product in juxtaposition with the hub collar 2.

The collar part 2 of the hub has an axial sleeve-accommodating opening 9 correspondingly formed to register with the splines and block teeth of the sleeve 1 for longitudinal press-on engagement therewith. It also has four longitudinally extending tapped openings 10 circumferentially spaced at 90° and approximately midway of its depth to receive product attaching bolts 11.

The wheel-like product 3 is here shown as a sprocket and relatively thin, with a thickness approximately one-quarter of the length of the sleeve 1. As mentioned, it need not be made of steel but may be fabricated of any suitable material desired having an axial sleeve-accommodating opening 12 correspondingly formed to register with the splines and block teeth of sleeve 1, in the same manner as the hub collar part 2 and is provided with four longitudinally extending bores 13 to align with the tapped openings 10 in the collar 2.

Normally the collar 2 is of a length equal to the length of the sleeve less the thickness of the intended product 3. The exterior diameter of the collar is preferably substantially less than that of the product, said collar being mounted in non-rotatable, press-on relation on said sleeve with its outer face flush with one end of the sleeve. Further, a set screw 16 may be threaded through aligned radial bores in the collar 2 and sleeve 1 centrally of a block tooth and registering keyway.

Figure 7:
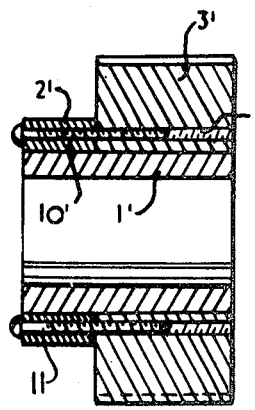
FIG. 7 is a vertical section through a modified assembly.

In FIG. 7, the sleeve 1' is similar in all respects to sleeve 1 already described except that it is of greater length to accommodate a thicker product 3', namely, a gear that has four circumferentially spaced openings 13' that are tapped. Conversely, the collar 2' has aligned bores 10' that are plane so that the bolts 11 are reversed in this case, passing through the bores in the collar and threading into the tapped openings in the product.

Figure 8:
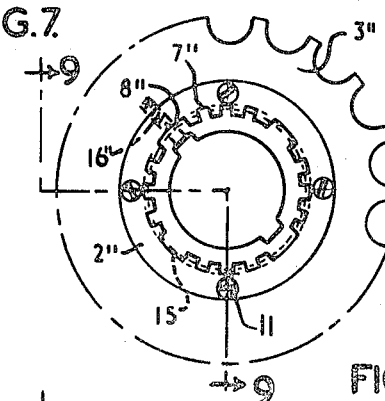
FIG. 8 is an end elevation of a further modified assembly.
Figure 9:
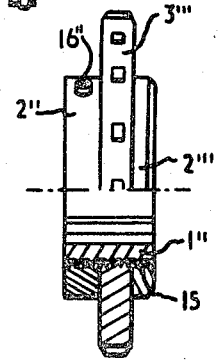
FIG. 9 is a side elevation, partly in section, as taken on line 9—9 of FIG. 8.

The modified device of FIGS. 8 and 9 employs a similar basic sleeve 1" but in addition to its longitudinally extending splines 7" and block teeth 8" it has an exterior threading 15 for a purpose to be presently described. The thread depth should not normally exceed 50% of the spline depth and preferably is confined to a range of 30% to 60% of the spline depth to avoid excessive encroachment on the torque load-bearing structure. In this embodiment, the product 3" is applied to the hub in the longitudinal press-on manner already described but is positioned about the longitudinal middle of the sleeve. It may have but does not need the circumferentially spaced bores of the product 3, seen in FIGS. 1, 3 and 6 because of a pair of coacting interiorly threaded collars 2" and 2'" are screwed on the opposite ends of the sleeve into tight and locking engagement with the opposite faces of the product. The collar 2" may be applied to the sleeve first and secured in position by a set screw 16" whose inner end preferably contacts the flat surface of a block tooth on the sleeve, this serves both to secure the hub collar against rotative movement and to accurately locate the collar. Then when the second collar or lock-nut 2'" is screwed on tightly it forces the product back against the first collar and into exact predetermined position.

Figure 10:
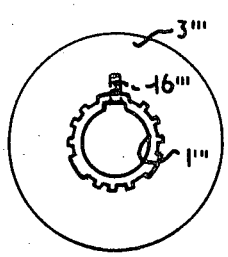
FIG. 10 is an end elevation of a further modified assembly.
Figure 11:
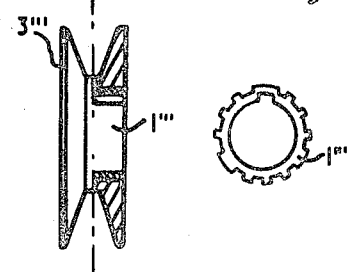
FIG. 11 is a side elevation thereof, with the right half shown in section.
Figure 12:
FIG. 12 is an end elevation of the hub sleeve member only.

Although the preceding hub assemblies are designed to accommodate products of small physical size, it will be recognized that neither the strength nor accuracy of the assembled device is compromised. The final form illustrated in FIGS. 10, 11 and 12, however, employs the sleeve 1'" in a simplified relation with the product 3'" for applications where space limitations are of paramount importance and torque requirements are low. The same type sleeve is used though three block teeth may be employed instead of four and a set screw 16'" located in the base of the V-pulley product 3'" is the only added element for here the hub collar is dispensed with. Actually where torque load is minimal, the block teeth may be unnecessary and indeed the product might have a plain axial bore and rely solely on the set screw.

It is to be noted that the novel two-part hub disclosed herein greatly facilitates economic manufacture in modular or component form. However, on account of the two-part construction it is necessary to design the components in such manner as to assure the assembly will function in the same way as if the hub were an integral unit of solid material. Here the introduction of the block teeth plays an important role in attaching the collar to the sleeve without impinging on and damaging the involute splines that are relied on to prevent tortional movement of the collar and mounted product.

While the improved spline form necessitated producing the hubs as separate parts this procedure automatically provided a feature which contributed materially to the usefulness of the final product. Whereas originally each hub required to be produced and sold as a complete unit, separate parts lend themselves to assembly in a variety of different forms and this feature provides not only enormous versatility but a very substantial reduction in original inventory investment cost.

An important feature provided by the block teeth is they are of sufficient width in each hub size to provide keyway accommodation for the necessary key for any given shaft size.

A further important feature of the block teeth is they extend the bore range of any given hub by permitting the shaft key to be partially buried in the space which ordinarily would be taken up by uniformly spaced involute splined teeth. This added accommodation for keyway recess extends the bore range thereby increasing the practical range of each size hub.

From the foregoing description taken in connection with the accompanying drawings, it will be manifest that a hub is provided that will fulfill all the necessary requirements of such a device, but many changes could be made in the above description and many apparently widely different embodiments of the invention may be constructed within the scope of the appended claims.

What is claimed is:

1. For shaft-carried products, a universal type interchangeable hub including a sleeve having a shaft accommodating bore with a longitudinally extending keyway and exterior longitudinally extending tooth-like splines interspersed with circumferentially spaced block teeth, said keyway being in radial registry with one of said block teeth.

2. A universal type interchangeable hub according to claim 1, wherein said sleeve has a radially disposed threaded bore through one of said block teeth with a set screw therein for affixing said sleeve on a shaft.

3. A universal type interchangeable hub for shaft-carried products according to claim 1, wherein the hub consists of two parts, namely a sleeve having a shaft-accommodating bore with a longitudinally extending keyway and exterior longitudinally extending tooth-like splines interspersed with circumferentially spaced block teeth, said keyway being in radial registry with one of said block teeth, and a collar with an axial sleeve-accommodating opening correspondingly formed to register with said splines and circumferentially spaced block teeth mounted on said sleeve in non-rotatable press-on relation with its outer face flush with one end of said sleeve.

4. The combination with the universal type interchangeable two-part hub according to claim 3, of a shaft-carried product having an axial sleeve-accommodating opening correspondingly formed to register with the splines and circumferentially spaced block teeth of said sleeve non-rotatably mounted in press-on relation on said sleeve and in tightly engaging juxtaposed relation to said collar and means attaching said product to said collar.

5. The combination with the universal type interchangeable two-part hub according to claim 3, of a shaft-carried product having an axial sleeve-accommodating opening correspondingly formed to register with the splines and circumferentially spaced block teeth of said sleeve non-rotatably mounted in press-on relation on said sleeve and in tightly engaging juxtaposed relation to said collar and circumferentially spaced fastening screws extending longitudinally through said product and threading into said collar.

6. The combination with the hub structure according to claim 1, of a shaft-carried product having an axial sleeve-accommodating opening correspondingly formed to register with the splines and block teeth of said sleeve for longitudinal press-on engagement therewith.

7. The combination with a hub according to claim 1, wherein the sleeve is exteriorly threaded to a depth not exceeding approximately 50% of the spline depth, of a shaft carried product having an axial sleeve-accommodating opening correspondingly formed to register with the splines and block teeth of said sleeve for longitudinal press-on engagement therewith and a pair of interiorly threaded collars screwed on opposite ends of said sleeve into tight and locking engagement with opposite faces of said product.

References Cited

UNITED STATES PATENTS

| | | | |
|---|---|---|---|
| 1,231,321 | 6/1917 | Alden et al. | 74—447 |
| 3,162,057 | 12/1964 | Burrell | 74—243 |
| 3,186,247 | 6/1965 | Burrell | 74—230.4 |

LEONARD H. GERIN, Primary Examiner

U.S. Cl. X.R.

74—243; 287—53